United States Patent [19]
Dalla Betta et al.

[11] 3,819,536
[45] June 25, 1974

[54] PROCESS FOR PREPARING A CATALYST BASED ON RUTHENIUM

[75] Inventors: Ralph A. Dalla Betta, Southfield; Haren S. Gandhi, Dearborn Heights; Joseph T. Kummer, Ann Arbor; Mordecai Shelef, Southfield, all of Mich.

[73] Assignee: Ford Motor Company, Dearborn, Mich.

[22] Filed: Dec. 26, 1972

[21] Appl. No.: 318,339

[52] U.S. Cl............. 252/462, 252/455 R, 252/457, 252/463, 252/466 PT, 252/473, 252/475, 252/477 R, 423/212
[51] Int. Cl............................................. B01j 11/08
[58] Field of Search...... 252/466 PT, 462, 473, 475, 252/457, 463, 455 R, 477 R; 423/212

[56] References Cited
UNITED STATES PATENTS
| | | | |
|---|---|---|---|
| 3,055,840 | 9/1962 | Koch | 252/466 PT |
| 3,155,724 | 11/1964 | Arthur | 252/466 PT |
| 3,696,167 | 10/1972 | Juguin et al | 252/466 PT |

*Primary Examiner*—Daniel E. Wyman
*Assistant Examiner*—A. P. Demers
*Attorney, Agent, or Firm*—William E. Johnson; Keith L. Zerschling

[57] ABSTRACT

A process is taught for producing a ruthenium catalyst. A fixing compound, selected from alkaline earth materials or rare earth materials which decompose to an oxide of the material, is deposited on a catalytic support. A hydrated, halogenated ruthenium compound which reduces to ruthenium is also deposited on the catalytic support. The materials on the support are heated in a reducing atmosphere to form the ruthenium metal. After the reducing step the materials are fixed by heating them to a ruthenate forming temperature. The product produced in this manner is desirable for use in the catalytic conversion, in a reducing atmosphere, of oxides of nitrogen. The ruthenium catalyst of the product produced by this method is resistant to volatilization when exposed to an oxidizing ambient.

12 Claims, No Drawings

PROCESS FOR PREPARING A CATALYST BASED ON RUTHENIUM

BACKGROUND OF THE INVENTION

U.S. Pat. application, Ser. No. 174,594, filed Aug. 25, 1971, now abandoned, and assigned to the same assignee as the present application, hereby incorporated by reference, teaches the use of ruthenium as a catalyst for converting oxides of nitrogen in combustion products of an engine into other compounds. In general, this same application teaches that ruthenium, in a reducing atmosphere, is effective to catalyze the reaction of oxides of nitrogen into other compounds without the formation of ammonia.

In working with such a ruthenium catalyst, it has been discovered that if such catalyst is exposed to an oxidizing ambient at high temperatures, any ruthenium metal contained therein will volatilize. Such oxidizing conditions are unavoidable in the operation of an engine as an oxidizing condition will generally occur upon a cold start of that engine or during some other mode of driving. Thus a ruthenium metal catalyst will slowly volatilize over the use of the engine and the conversion efficiency of a catalyst system based on pure, unprotected, ruthenium metal will decrease.

In view of such a decrease of efficiency, it is desirable to fix somehow the ruthenium in such a catalyst system in a manner that it will not volatilize when exposed to an oxidizing ambient. It is desirable to fix the ruthenium in such a fashion that its exposure to an oxidizing ambient will not adversely affect its ability to convert subsequently any undesirable nitrogen compounds found in an exhaust gas having reducing characteristics.

SUMMARY OF THE INVENTION

This invention relates to a method of forming a ruthenium containing catalyst and the product produced thereby and, more particularly, to such a method in which the ruthenium is fixed in the catalytic system in such a manner that its effectiveness is not destroyed or reduced by exposure of the system to an oxidizing ambient.

In its broadest application, the method of this invention is carried out by placing a fixing compound selected from the group comprising alkaline earth materials and rare earth materials which form oxides thereof upon decomposition on a catalytic support and which also subsequently form ruthenates. Also deposited on the catalytic support is a hydrated, halogenated ruthenium compound which reduces to ruthenium. The compounds deposited on the catalytic support are treated in a reducing atmosphere to reduce the ruthenium compound. The catalytic support is then heated to a temperature sufficient for the ruthenium to react with the fixing compound to produce a ruthenate.

In greater detail, the method of this invention teaches that the application of the compounds to the catalytic support may take place by soaking a support in a solution of the compounds. The order of application of the materials is semi-critical and it is preferred to deposit the ruthenium metal last so that it is not covered over and so that the reducing step may be effectively carried out thereon. A preferred ruthenium compound is ruthenium trichloride and in the final catalytic system the concentration of ruthenium should be from at least 100 parts per million (ppm) to 20,000 ppm.

The product produced by this method is a ruthenium catalyst system in which ruthenium is effective for catalyzing the reduction of nitrogen oxide compounds to other compounds without any substantial formation of ammonium. The catalyst system is also one which will not volatilize or have its efficiency decreased substantially after the system has been exposed to an oxidizing ambient.

The compounds used in the method of this invention may be deposited on compatible type of a catalytic support known in the art. The catalytic support may be pretreated with a selected material in order to increase its effective surface area prior to the deposition of the compounds in accordance with this invention.

DESCRIPTION OF THE PREFERRED EMBODIMENT

In order to illustrate the method of this invention, a preferred embodiment is described hereinbelow.

A 4 21/32 inch diameter by 3 inch long catalytic support produced in the manner such as shown in Johnson, et al, U.S. Pat. No. 3,444,925 is selected which weights about 500 grams. The support is coated with a slurry containing 15 percent by weight of "Dispal-M," a gamma alumina sold by Continental Oil Company. This material is a hydrated alumina and is typical of the many materials which are available of this type. The slurry is applied to the support in order to increase its effective surface area for catalytic deposition. The coated support is dried at 120°C and calcined at 600°C. The above procedure is repeated, generally two or three times, until about 10 percent by weight of the support is the gamma alumina. The surface area of the support at this point is about 14 square meters per gram.

The next step in the method taught herein is to coat the catalytic support with a fixing compound selected from the group consisting of alkaline earth materials and rare earth materials, which fixing compound upon thermal decomposition will produce an oxide of the alkaline earth material or the rare earth material which will subsequently react with ruthenium to form a ruthenate. In this specific example, the monolith or support is impregnated with a solution containing $Ba(NO_3)_2$. The 3 inch long support weighing 500 grams picks up about 125 cc. of solution. In this case, a solution containing 15 grams of barium as $Ba(NO_3)_2$ is used to impregnate the support. This will result in 3 percent of the total weight of the support being barium. The support is dried at 120°C and calcined at 600°C for 2 hours.

The next step in the overall method is to coat the catalytic support with a hydrated, halogenated ruthenium compound which produces ruthenium upon reduction. In this particular example, the compound selected to accomplish this is a ruthenium trichloride. Sufficient ruthenium trichloride is dissolved in water so that, in this case, 2,000 ppm ruthenium is carried over onto the support. After the catalytic support has been impregnated with the solution, the support is dried at 120°C.

The next step in the procedure is to subject the support on which the two materials have been coated to a reducing atmosphere. In this preferred embodiment, the reducing operation is carried out in a hydrogen atmosphere at 400°C to 450°C for 4 hours. This step results in a very finely dispersed ruthenium in close proximity with barium oxide. The ruthenium metal on the catalyst surface is then fixed, as a ruthenate, by heating the support to a temperature in the range of 800°C to 1,000°C for 10 minutes to 6 hours.

It may be questioned that the barium oxide might react with the gamma alumina but this has been checked and we have found that barium oxide does not react at temperatures up to 1,300°C with gamma alumina in a dry system.

The catalyst system constructed as above described when tested on a dynamometer, gave 100 percent $NO_x$ conversion efficiency at 850°F and at space velocity equal to 70,000 hours$^{-1}$. The procedures of the above example may be repeated utilizing various rare earth materials formed from such materials as lanthanum, cerium, praseodymium, samarium, etc., or it may be based on alkaline earth materials formed from strontium, calcium, magnesium, and beryllium. While the ruthenium containing solution was formed from ruthenium trichloride, other halogenated compounds of ruthenium may be used or any other soluble salts.

The support described herein is only one of many types of supports which are already known in the art. It is true that other catalytic supports may be used in the method of this invention. In some cases, because of the already extensive surface area of a particular catalytic support, it is not necessary to increase the surface area of the support by further treatment. A catalytic support can also be in the form of pellets, beads or any small type structures already known in the art.

As mentioned above, the major steps involved herein involve the reducing of the ruthenium once it has been placed on the catalytic support in order to develop ruthenium. Once the ruthenium metal is developed, it is fixed in place by heating the support to a high temperature for a set period of time. In this condition, the ruthenium metal has an opportunity to react with the decomposed stabilizing compound, namely an alkaline earth oxide or rare earth oxide, to form a ruthenate. Once the ruthenate is formed, the catalyst system is complete.

As an explanation of the theory by which the catalyst system of this invention is operative, certain tests were carried out on the materials employed herein and the following was discovered. Thermo-gravimetric analysis show that ruthenates, for example barium ruthenate, are stable towards volatilization under oxidizing conditions up to 1,100°C whereas ruthenium oxide powder starts to volatilize at a slow rate even at temperatures as low as 400° to 500°C and at very fast rate when held at 1,100°C under oxidizing conditions. When only ruthenium oxide is employed in an oxidizing ambient, it takes only about 3 hours to lose 30 percent of the compound at 1,100°C and a space velocity equal to 600 hr$^{-1}$ due to volatilization compared with no loss at all in the case of a ruthenate such as barium ruthenate. These tests are conducted on the pure material and not on the material deposited on a catalytic support.

Further thermo-gravimetric studies on barium ruthenate showed that barium ruthenate, when subjected to a stream of 6.5 percent CO and the balance of nitrogen, loses weight at 450°C. The sample was held at 1,200°C for an hour until it reached a steady state weight. A portion of the sample was analyzed by x-ray diffraction and was found to contain barium oxide and ruthenium metal. The sample was then subjected to a stream of air at 1,200°C whereby it regained some weight. The sample was analyzed by x-ray diffraction and it was found to be pure barium ruthenate. This testing was repeated on another sample of barium ruthenate which was subjected to the reduction and oxidation cycle at 1,200°C. Each time after oxidation, the sample came back to the exact initial weight. At the end of the sixth cycle, the sample was analyzed by x-ray diffraction techniques and was identified as pure barium ruthenate. Similar thermo-gravimetric experiments were done on pure lanthanum ruthenate which was also found to behave in a similar fashion. Lanthanum ruthenate reduces under reducing conditions to lanthanum oxide and ruthenium and under oxidizing conditions oxidizes to lanthanum ruthenate.

The explanation, therefore, of the mechanism of the ruthenium catalyst system disclosed herein is believed to be as follows. Under the reducing conditions wherein the ruthenium is employed to reduce undesirable nitrogen compounds, the active catalytic material on the catalyst substrate is finely divided ruthenium. The ruthenium in its finely divided state is closely associated with an adjacent zone of the stabilizing alkaline earth oxide or rare-earth oxide. Thus during active catalytic operation, ruthenium is the catalyst. However, when oxidizing conditions exist and the ruthenium is subjected to an oxidizing ambient, the ruthenium metal reunites with the stabilizing alkaline earth oxide or rare-earth oxide to form a stable ruthenate. The ruthenate composition does not volatilize. When the catalyst is once again subjected to a reducing condition, the ruthenate compound once again reforms ruthenium and the stabilizing oxide.

It should be mentioned at this point that since the conditions in the exhaust do not usually reach these high temperatures, that the catalyst in actual use may not behave in the clear cut manner described. Under conditions of use, where such high temperatures (1,200°C) are not reached, the catalyst may be only partially reduced to ruthenium metal or only the surface layer of the ruthenate reduced to ruthenium metal or even just a decrease in the nominal valance of the surface ruthenium atoms. Under oxidizing conditions, these processes would be reversed.

In view of this disclosure, many modifications of this invention will be apparent to those skilled in the art. It is intended that all such modifications which fall within the true scope of this invention be included within the terms of the appended claims.

We claim:

1. A method of forming a ruthenium containing catalyst system in which the activity of the catalytic material of the system is not destroyed or severely reduced when the system is exposed to oxidizing conditions of either a prolonged or a sporadic nature, which method comprises the steps of:

coating a suitable catalytic support with a fixing compound selected from the group consisting of alkaline earth materials and rare earth materials, which compound upon decomposition produces an oxide of the alkaline earth material or the rare earth material;

coating said catalytic support with a hydrated, halogenated ruthenium compound which produces ruthenium upon reduction;

reducing the ruthenium compound which has been applied to said catalytic support to ruthenium; and fixing the ruthenium with said fixing compound by heating said catalytic support to a temperature sufficient to have said compounds form a ruthenate.

2. The method of claim 1 wherein: said reducing step is carried out in a hydrogen atomosphere at a temperature in the range of 200°C to 800°C for 1 hour to 20 hours.

3. The method of claim 1 wherein: said fixing step is carried out at a temperature in the range of 800°C to 1,000°C for 10 minutes to 6 hours.

4. The method of claim 1 further including:
depositing of gamma alumina containing material on said catalytic support;
drying said catalytic support; and
calcining said support all prior the deposition of said coatings on said catalytic support.

5. The method of claim 1 wherein: said hydrated, halogenated ruthenium compound is placed on said catalytic support prior to said other material.

6. A method of forming a ruthenium containing catalyst system in which the activity of the catalytic material of the system is not destroyed or severely reduced when the system is exposed to oxidizing conditions of either a prolonged or a sporadic nature, which method comprises the steps of:
preparing a first solution of a fixing compound selected from the group consisting of alkaline earth materials and rare earth materials, which compound upon decomposition produces an oxide of the alkaline earth material or the rare earth material;
soaking a catalytic support in said first solution;
drying said catalytic support;
calcining said catalytic support;
preparing a second solution of a hydrated, halogenated ruthenium compound which produces ruthenium upon reduction;
soaking said catalytic support in said second solution;
drying said catalytic support;
reducing the ruthenium compound applied to said catalytic support; and
fixing the ruthenium with said fixing compound by heating said catalytic support to a temperature sufficient to have said compounds form a ruthenate.

7. The method of claim 6 wherein: the order of soaking the catalytic support in said two solutions is reversed.

8. The method of claim 6 wherein: said first solution has a concentration in the range of 2.0 percent to 40 percent, and wherein said soaking of said catalytic support is for a time from 5 minutes to 3 hours, whereby the concentration of said material from said first solution on said catalytic support in the final article will be in the range from 0.5 percent to 10 percent.

9. The method of claim 6 wherein: said second solution has a concentration in the range of 0.04 percent to 8 percent, and wherein said soaking of said catalytic support is for a time from 5 minutes to 3 hours, whereby the concentration of said ruthenium compound on said catalytic support from said second solution will produce a ruthenium metal concentration in the final article in the range from 100 ppm to 20,000 ppm.

10. The method of claim 6 wherein: both drying steps take place at a temperature in the range from 50°C to 300°C and for a time in the range from 1 hour to 10 hours; and wherein said calcining step take place at a temperature in the range from 400°C to 800°C and for a time in the range from 1 hour to 10 hours.

11. The method of claim 6 wherein: said reducing step is carried out in a hydrogen atmosphere at a temperature in the range of 200°C to 800°C for 1 hour to 20 hours.

12. The method of claim 6 wherein: said fixing step is carried out at a temperature in the range of 800°C to 1,000°C for 10 minutes to 6 hours.

* * * * *